United States Patent
Aotani et al.

(10) Patent No.: US 9,818,539 B2
(45) Date of Patent: Nov. 14, 2017

(54) THIN FILM CAPACITOR WITH IMPROVED RESISTANCE TO DIELECTRIC BREAKDOWN

(71) Applicant: TDK CORPORATION, Tokyo (JP)

(72) Inventors: Junji Aotani, Tokyo (JP); Shigeaki Tanaka, Tokyo (JP); Katsuyuki Kurachi, Tokyo (JP); Tatsuo Namikawa, Tokyo (JP); Yuuki Aburakawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 162 days.

(21) Appl. No.: 14/882,013

(22) Filed: Oct. 13, 2015

(65) Prior Publication Data

US 2016/0111211 A1    Apr. 21, 2016

(30) Foreign Application Priority Data

Oct. 15, 2014    (JP) .................. 2014-210937

(51) Int. Cl.
| H01G 4/12 | (2006.01) |
| H01G 4/005 | (2006.01) |
| H01G 4/33 | (2006.01) |
| H01G 4/255 | (2006.01) |

(52) U.S. Cl.
CPC .............. *H01G 4/12* (2013.01); *H01G 4/005* (2013.01); *H01G 4/255* (2013.01); *H01G 4/33* (2013.01)

(58) Field of Classification Search
CPC combination set(s) only.
See application file for complete search history.

(56) References Cited

U.S. PATENT DOCUMENTS

| 4,464,823 A | 8/1984 | Izu et al. |
| 4,510,674 A | 4/1985 | Izu et al. |
| 4,510,675 A | 4/1985 | Izu et al. |
| 4,731,695 A * | 3/1988 | Brown ............... H01G 4/20 29/25.42 |
| 5,587,614 A | 12/1996 | Hwang et al. |
| 5,854,499 A | 12/1998 | Nishioka |
| 5,923,062 A | 7/1999 | Ohno |

(Continued)

FOREIGN PATENT DOCUMENTS

| JP | S61-64112 A | 4/1986 |
| JP | H06-112081 A | 4/1994 |

(Continued)

*Primary Examiner* — David M Sinclair
(74) *Attorney, Agent, or Firm* — Gang Luo

(57) ABSTRACT

A thin film capacitor includes a lower electrode layer, an upper electrode layer, and a dielectric substance layer provided between the lower electrode layer and the upper electrode layer. A dielectric patch member formed of a dielectric material is formed on a surface of the dielectric substance layer on an upper electrode layer side, a cross-sectional structure of the dielectric patch member has a taper angle of 1 to 25 degrees in a cross section perpendicular to the dielectric substance layer, the taper angle being an angle formed by (1) a tangential line tangent to an end portion of the dielectric patch member at a position that is 50% of a maximum height of the dielectric patch member and (2) a line being an interface between the dielectric substance layer and the upper electrode layer, and an area of the dielectric patch member is 100 to 900000 µm².

8 Claims, 3 Drawing Sheets

(56) References Cited

U.S. PATENT DOCUMENTS

| | | |
|---|---|---|
| 5,936,257 A | 8/1999 | Kusunoki et al. |
| 5,970,337 A | 10/1999 | Nishioka |
| 6,132,585 A | 10/2000 | Midorikawa et al. |
| 6,166,424 A | 12/2000 | Mikawa et al. |
| 6,207,522 B1 | 3/2001 | Hunt et al. |
| 6,270,835 B1 | 8/2001 | Hunt et al. |
| 6,288,890 B1 | 9/2001 | Saito et al. |
| 6,433,993 B1 | 8/2002 | Hunt et al. |
| 6,728,092 B2 | 4/2004 | Hunt et al. |
| 6,751,833 B2 | 6/2004 | Saito et al. |
| 7,319,081 B2 | 1/2008 | Sakashita et al. |
| 7,524,552 B2 | 4/2009 | Yokota et al. |
| 7,592,626 B2 | 9/2009 | Ozaki et al. |
| 9,564,270 B2 * | 2/2017 | Aotani ............ H01G 4/33 |
| 2007/0131935 A1 * | 6/2007 | Ozaki ............ H01G 4/206 257/68 |
| 2008/0239626 A1 * | 10/2008 | Yoshizawa ............ H01G 4/252 361/313 |

FOREIGN PATENT DOCUMENTS

| | | |
|---|---|---|
| JP | H08-78283 A | 3/1996 |
| JP | H10-27729 A | 1/1998 |
| JP | H10-247612 A | 9/1998 |
| JP | 2000-178793 A | 6/2000 |
| JP | 2001-356367 A | 12/2001 |
| JP | 2002-026266 A | 1/2002 |
| JP | 2002-043517 A | 2/2002 |
| JP | 2002-110468 A | 4/2002 |
| JP | 2002-185148 A | 6/2002 |
| JP | 2002-231574 A | 8/2002 |
| JP | 2003-011270 A | 1/2003 |
| JP | 2004-165596 A | 6/2004 |
| JP | 2005-101348 A | 4/2005 |

* cited by examiner

THIN FILM CAPACITOR WITH IMPROVED RESISTANCE TO DIELECTRIC BREAKDOWN

TECHNICAL FIELD

The present invention relates to a thin film capacitor.

BACKGROUND

In recent years, in various electronic devices, spaces for installing electronic components have tended to be reduced. Thus, capacitors have a demand for a reduction in profile. For the reduction of capacitors in profile, it is effective to reduce the thicknesses of dielectric substance layers. One of the known techniques is a capacitor on which a thin dielectric substance layer is formed on an electrode by a thin film forming technique such as sputtering (hereafter, referred to as a thin film capacitor). However, the attempt to reduce the thickness of a dielectric substance layer has a tendency to result in the reduction of the withstanding voltage or the leakage characteristics of the dielectric substance layer. For this reason, techniques have been studied to improve a withstanding voltage and leakage characteristics with reducing the thickness of a dielectric substance layer. For example, Patent Literature 1 discloses a technique to improve the leakage characteristics and the withstanding voltage of a dielectric substance layer in a thin film capacitor, by optimizing the material and its crystalline structure of the dielectric substance layer, and optimizing the orientation with respect to a substrate surface.

CITATION LIST

Patent Literature

[Patent Literature 1] Japanese Unexamined Patent Publication No. 2004-165596

SUMMARY

By techniques represented by Patent Literature 1, a dielectric element including a thin dielectric substance layer, with a low leakage current and a high withstanding voltage is manufactured. However, the dielectric substance layer (dielectric material) of a capacitor has piezoelectric properties, and thus mechanical deformation occurs in the dielectric substance layer through the use of the element. The present inventors found, through a long-term reliability test of a thin film capacitor sample, that if a dielectric substance layer receives mechanical deformation for a long period, mechanical stress is accumulated in the dielectric substance layer, and the stress may cause dielectric breakdown in the long run.

The present invention is made in view of the above-described finding and has an object to provide a thin film capacitor that prevents dielectric breakdown due to mechanical stress and has a good durability.

A thin film capacitor of the present invention comprises a lower electrode layer, a dielectric substance layer, and an upper electrode layer, and on the surface of the dielectric substance layer facing the upper electrode layer, a dielectric patch member made of a dielectric material is included. The dielectric patch member can function as a center for controlling (leaking, adjusting) charge or stress accumulated in the dielectric substance layer. In the thin film capacitor, mechanical stress is accumulated through its use, and distortion of the structure of the dielectric substance layer occurs at a spot where the stress is accumulated, which tends to develop local accumulation of charge (electric charge). An electric charge exceeding the limit of retention to be abruptly released may cause dielectric breakdown to the dielectric substance layer. According to the structure of the thin film capacitor of the present invention, electric charge accumulated a posteriori in the dielectric substance layer is first concentrated in the dielectric patch member. The electric charge concentrated in the dielectric patch member is released as interfacial current that is transmitted through an interface between the dielectric patch member and the dielectric substance layer to reach the upper electrode layer. With this configuration, it is considered that even if local accumulation of electric charge occurs in the dielectric substance layer due to mechanical stress on the thin film capacitor, the accumulated electric charge does not rapidly move in the thickness direction of the dielectric substance layer, which makes it difficult to cause dielectric breakdown to the dielectric substance layer.

A cross-sectional structure of the dielectric patch member perpendicular to the dielectric substance layer in the thin film capacitor of the present invention has a gentle taper angle that is from 1 degree to 25 degrees formed by (1) a tangential line tangent to an end portion of the dielectric patch member at a position that is 50% of a maximum height of the dielectric patch member and (2) a line being an interface between the dielectric substance layer and the upper electrode layer. With this structure of the thin film capacitor, an effect of appropriately controlling the movement of the electric charge in the interface between the dielectric patch member and the dielectric substance layer can be obtained. If the angle is wider than 25 degrees, the accumulation of electric charge in an outermost portion becomes large, causing short circuit or leakage current. In addition, if the angle is less than 1 degree, poor adhesion of the film occurs, and the accumulation of electric charge spreads over a wide area, also causing short circuit or leakage current. Note that the end portion of the dielectric patch member refers to the outline of the dielectric patch member in the above-described cross-sectional structure. In addition, the outermost portion refers to the outline of the dielectric patch member when the dielectric patch member is viewed in plan from above.

The area of the dielectric patch member in the thin film capacitor of the present invention is 100 $\mu m^2$ or more and 900000 $\mu m^2$ or less. The area of the dielectric patch member refers to the area of the interface between the dielectric patch member and the dielectric substance layer, and refers to an area equivalent to the projected area of the dielectric patch member. A method of measuring the area of the dielectric patch member can be implemented by software performing image recognition of contrast difference in an enlarged photograph taken by a SEM, and calculating the area inside a boundary portion. The electric charge accumulated in the outermost portion of the dielectric patch member can basically move in the direction of the interface between the dielectric patch member and the dielectric substance layer. The present inventors conducted simulations and experiments and studies the resulting electric resistances. If the area exceeds 900000 $\mu m^2$, short circuit or leakage current is likely to occur in the thin film capacitor. This is because it can be considered that electric charge accumulated in the outermost portion of the dielectric patch member tries flowing in the thickness direction of the dielectric substance layer that is relatively low electric resistance. On the other hand, if the area falls below 100 $\mu m^2$, short circuit or leakage current is likely to occur in the thin film capacitor. This is because it can be considered that charge consumption in a planar direction is insufficient, which makes electric charge reach a nucleus portion.

The thin film capacitor of the present invention may comprise a nucleus portion in the interface between the dielectric substance layer and the dielectric patch member. The nucleus portion herein exists inside the dielectric patch member or in the interface between the dielectric substance layer and the dielectric patch layer, and is formed by a recessed portion of the dielectric film, a projecting portion made by a particle, a linear crack, electric singularity, or the like. The nucleus portion can function as a starting point of forming the dielectric patch member, when the dielectric patch member is formed in an electrophoresis manner. This makes it easy to form and fix the dielectric patch member, or to control its position, further increasing the effect of the present invention.

The relative permittivity of the dielectric patch member may be 0.01 times or more and 0.7 times or less the relative permittivity of the dielectric substance layer. A difference in relative permittivity between the dielectric substance layer and the dielectric patch member enables mechanical stress and electric charge distributed on the surface of the dielectric substance layer to be further concentrated. This further increases the effect of the present invention. However, when the difference in relative permittivity falls below 0.01 times or exceeds 0.7 times, there is the risk of electric charge due to mechanical stress being not smoothly passed from the dielectric substance layer to the dielectric patch member, and dielectric breakdown may occur in the long run.

The crystalline state of the dielectric patch member may differ from the crystalline state of the dielectric substance layer. This has an effect of concentrating mechanical stress and electric charge distributed on the surface of the dielectric substance layer, making use of the difference in crystalline state, so as to appropriately control the film stress of the thin film capacitor. For this reason, the effect of the present invention is further increased. Specifically, a conceivable example is such that the crystalline state of the dielectric substance layer is a column crystal, and the crystalline state of the dielectric patch member is of a microcrystal structure.

The crystalline state of the dielectric patch member may be in particular amorphous. This is because the crystalline state being amorphous can further enhance the effect of concentrating mechanical stress and electric charge distributed on the dielectric substance layer surface in the dielectric patch member. This further increases the effect of the present invention.

According to a thin film capacitor of the present invention, dielectric breakdown due to mechanical stress is suppressed, and it is possible to maintain the properties of thin film capacitor over a long period.

DETAILED DESCRIPTION

Hereafter, a preferred embodiment of the present invention will be described with reference to the accompanying drawings, but the present invention is not limited to the following embodiment. Note that identical or equivalent elements will be denoted by the same reference symbols and the description thereof will be omitted if it is redundant.

Figure 1:
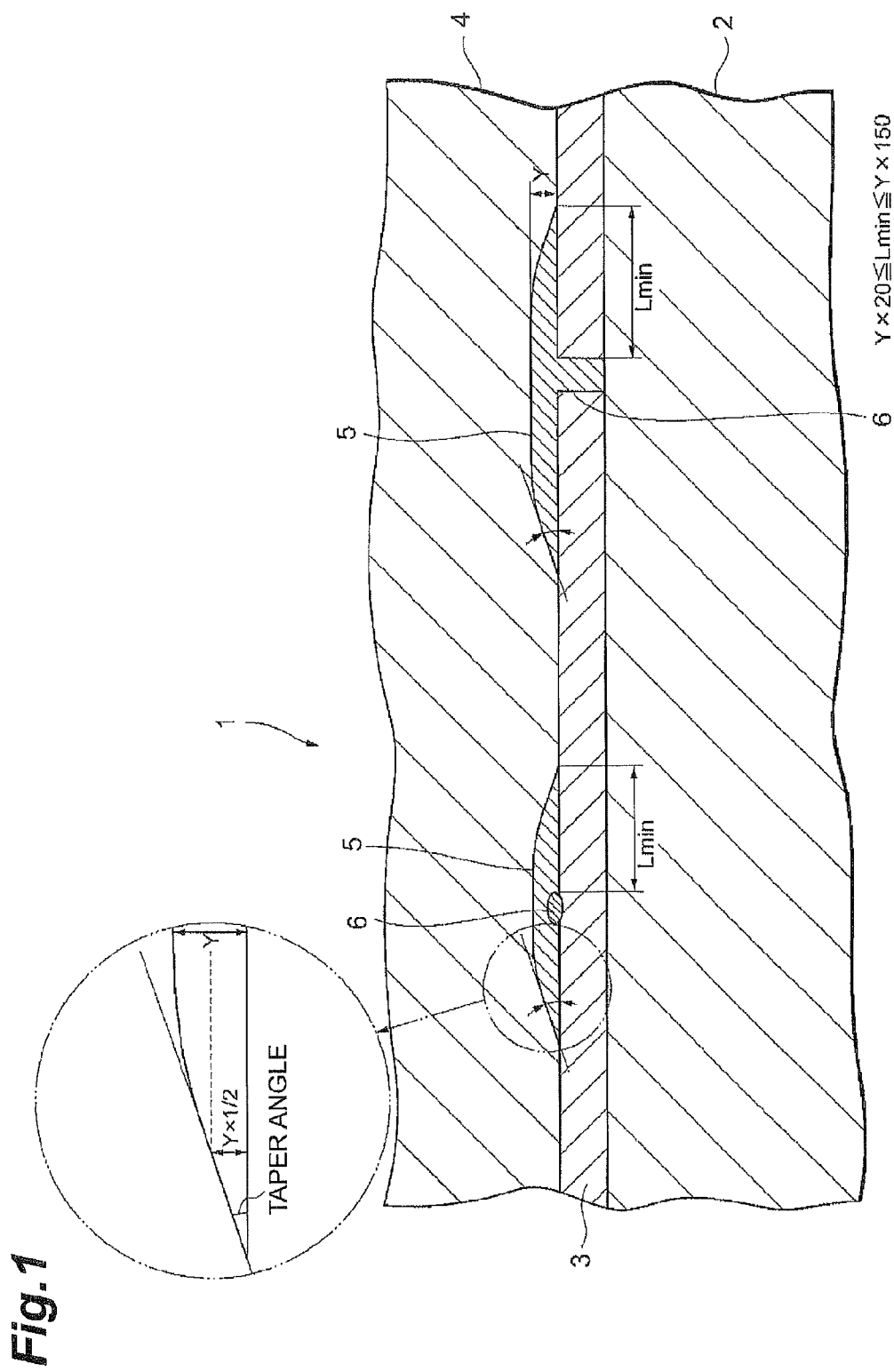
FIG. 1 is a schematic cross-sectional view of a thin film capacitor in an embodiment of the present invention.

FIG. 1 is a cross-sectional view of a thin film capacitor in an embodiment of the present invention. A thin film capacitor 1 is formed by a lower electrode layer 2, a dielectric substance layer 3 that is formed on the lower electrode layer 2, and an upper electrode layer 4 that is further formed thereon.

As the material of the lower electrode layer 2 in the present embodiment, well-known conductive materials can be selected as appropriate. The well-known conductive materials refer to, for example, metals, metallic oxides, conductive organic materials, and the like. In particular, the lower electrode layer 2 preferably has a low electric resistance and a high mechanical strength, and thus metallic materials can be used therefor. Above all, Ni or Cu can be a relatively sturdy metallic material having a low electric resistance. In particular, in terms of the viewpoint of high-temperature load reliability and moisture-proof load reliability, the lower electrode layer 2 may be a conductive body containing at least a Ni. The conductive body containing Ni mentioned here refers to a pure Ni (99.9% or more of Ni) or a Ni-based alloy. In the case of a Ni-based alloy, a noble metal element such as Pt, Pd, Ir, Ru, and Rh may be contained, and the content thereof can be 50 wt % or less. Within such a range of content, it is possible to obtain the high-temperature load reliability and the moisture-proof load reliability of the thin film capacitor 1 equivalent to the case of using a pure Ni.

The form of the lower electrode layer 2 in the present embodiment can be selected from various forms such as a conductivity foil containing a metal, a sintered body containing a metal, a conductive thin film formed on a substrate of any kind, and the like. In particular, the lower electrode layer 2 may be a Ni foil consisting of a metal polycrystal. By making the lower electrode layer 2 into a metallic foil, it is possible to reduce the difference in thermal expansion coefficient from the dielectric substance layer 3 and to suppress the reduction of capacitance of the thin film capacitor 1. As the conductive thin film, for example, an electrode layer obtained by forming a conductive thin film of a Ni electrode layer, as the lower electrode layer 2, on a Si substrate or a ceramic substrate (not shown) by sputtering, vapor deposition, or the like may be used. In the case of such a form, as the substrate, a material of a thermal expansion coefficient having a small difference from that of the dielectric substance layer 3 is desirably used. For the substrate, for example, a Si substrate with a Ni film, a ceramic substrate with a Ni film, or the like can be used. It is thereby possible to suppress the reduction of the capacitance of the thin film capacitor 1 due to the difference in thermal expansion coefficient.

Furthermore, the form of the lower electrode layer 2 in the present embodiment may be one in which a different conductive material is interposed between the lower electrode layer 2 and the dielectric substance layer 3. Alternatively, the lower electrode layer 2 may have a multi-layered electrode structure. The multi-layered electrode structure can be a multi-layered electrode film in which a Ni electrode layer is disposed on the side of a surface facing the dielectric substance layer 3. Such a multi-layered electrode film may have, for example, a structure in which a Ni electrode layer is provided on a Cu foil by sputtering, vapor deposition, or the like. Note that, in the case where the Ni electrode layer is in contact with the dielectric substance layer 3, the high-temperature load reliability and the moisture-proof load reliability of the thin film capacitor 1 are further enhanced.

The material of the dielectric substance layer 3 in the present embodiment can be a perovskite oxide dielectric material, which has a high relative permittivity. Of perovskite dielectric materials, a barium titanate-based dielectric material without a lead is preferable in terms of environmental preservation viewpoint. In the case of a barium titanate-based dielectric material, a barium titanate-based dielectric in which a part of a Ba site is substituted with an alkaline earth such as Ca and Sr may be used. In addition, a barium titanate-based dielectric material in which a part of Ti site is substituted with an element such as Zr, Sn, and Hf may be used. Furthermore, a rare-earth element or Mn, V, Nb, Ta, or the like may be added to the dielectric material.

For the formation of the dielectric substance layer 3 in the present embodiment, a method typically used in thin film formation, for example, the application of a solution by metal organic decomposition (MOD) or the like, sputtering, vapor deposition, PLD (Pulse Laser Deposition), CVD, or the like can be used as appropriate.

The structure of the dielectric substance layer 3 in the present embodiment can be a thin film having a film thickness of 1000 nm or less. A thin film having a thickness more than 1000 nm may have a reduced capacitance value per unit area. In addition, there is no lower limit in particular on the film thickness, but an insulation resistance value becomes smaller as the thickness becomes small. For this reason, it is considered that the film thickness of the dielectric substance layer 3 needs to be 50 nm or more. In view of the above relationship between the insulation resistance value and the capacitance, it is considered that a preferable range of the film thickness of the dielectric substance layer 3 in the thin film capacitor 1 is from 250 nm to 1000 nm. Note that the crystalline structure of the dielectric substance layer 3 can be polycrystal.

A nucleus portion 6 in the present embodiment can be introduced by various methods. For example, the nucleus portion 6 may be formed by irradiating the formed dielectric substance layer 3 with electromagnetic waves such as laser. Alternatively, the nucleus portion 6 may be physically formed by causing hard ceramic powder or the like to collide therewith. The nucleus portion 6 may be formed by mechanically deforming the dielectric substance layer 3 to artificially and locally break it. The nucleus portion 6 may be formed by causing particles to adhere to a charged region of the dielectric substance layer 3. For example, the nucleus portion 6 may be formed by putting particles and a sample in a container as appropriate, the sample including the dielectric substance layer 3 formed thereon, and bringing them into contact with each other. The contact may be made by gas flux of particles that are sprayed and flowing in the gas, or may be made in a cistern in which particles are dispersed in pure water or organic solvent. In addition, the contact may be made by causing particles to reside and adhere to the dielectric substance layer 3 in a formation process of the dielectric substance layer 3.

In the present embodiment, a dielectric patch member 5 is formed after the formation of the dielectric substance layer 3. The surface of the dielectric substance layer 3 may be subjected to surface treatment, physical cleaning, or the like before forming the dielectric patch member 5. As the surface treatment, etching using an acid or an alkali, etching using plasma, or the like may be performed. As the physical cleaning, ultrasonic cleaning, polishing, or the like may be performed. By such processes, the interfacial state between the dielectric substance layer 3 and the dielectric patch member 5 is made good, which in turn stabilizes electric properties over the long term.

Figure 2:
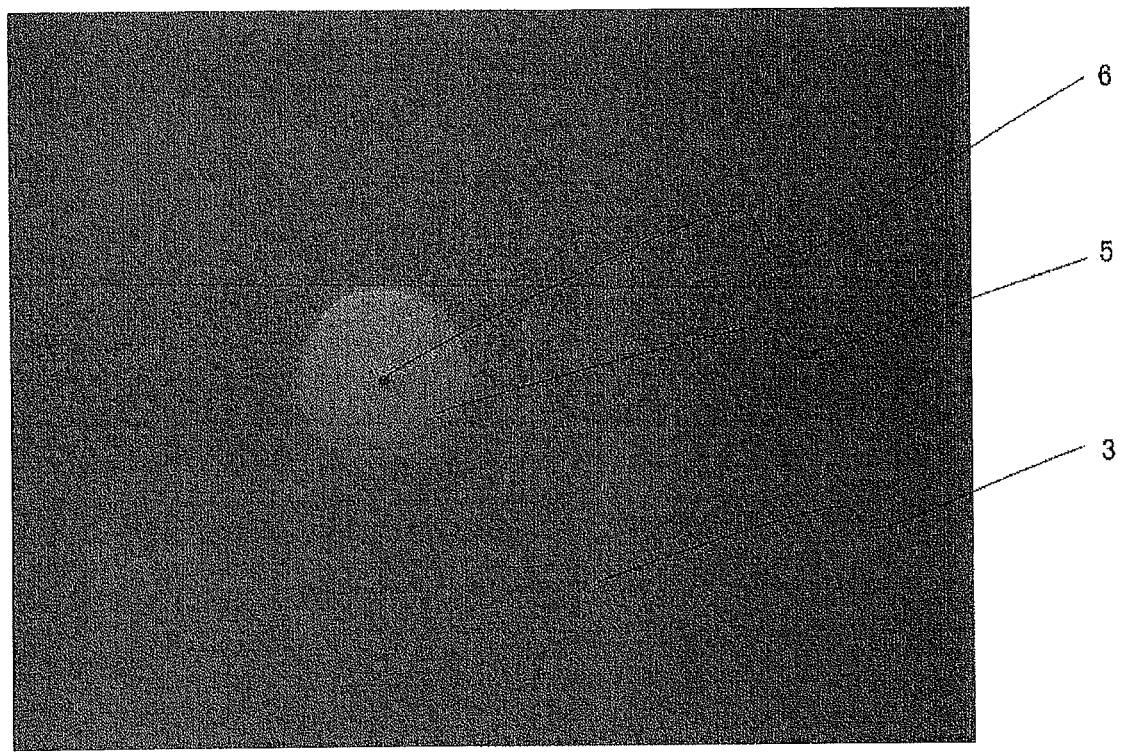
FIG. 2 is an observed image of a dielectric patch member according to the embodiment of the present invention, taken by an optical microscope.

FIG. 2 is an observed image of the dielectric patch member 5 according to an embodiment of the present invention, taken by an optical microscope. In the observation example, the area of the dielectric patch member 5 measured 8000 $\mu m^2$.

The material of the dielectric patch member 5 in the present embodiment is a dielectric material. A single kind of dielectric material may be used, or two or more kinds of dielectric material may be used in combination. There will be specifically described an example of a process of forming an insulating layer that is made of dielectric ceramic particles. In this example, a dielectric material in which fine particles of dielectric ceramic are dispersed in organic solvent is used. As the dielectric ceramic, barium titanate, strontium titanate, or calcium titanate, or the like, which has a perovskite structure, is used. The particle size of the fine particles may be made range, for example, from 3 nm to 20 nm. Note that for fine particles, a resin suitable to form a high-viscosity solution capable of being discharged can be used. For example, as a resin material, a high-resistance resin material such as acrylic resin, an epoxy resin, a fluororesin, a urethane resin, an amide resin, a phenolic resin, a PEEK (polyetheretherketone) resin, a polycarbonate resin, a polybutadiene resin, and a polyimide resin, can be used. Then, coating of this resin material is made the insulating layer that is made of the resin and the dielectric ceramic particle dispersed in this resin.

Figure 3:
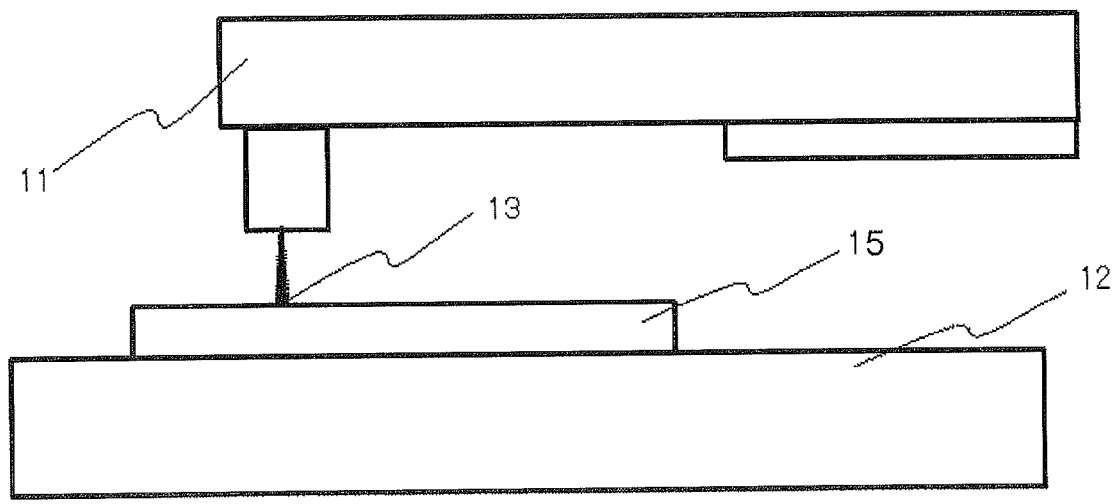
FIG. 3 is a scheme of a solution discharging device according to the embodiment of the present embodiment.

FIG. 3 illustrates a scheme of a solution discharging device, which is an example of a method of forming the dielectric patch member in the present embodiment. In the solution discharging device, a discharging solution 13 (a high-viscosity solution) that contains dielectric ceramic particles is discharged in spraying by a solution spraying unit 11, being aimed at the nucleus portion of a stacked body 15 (in which the dielectric substance layer 3 is formed on the lower electrode layer 2) placed on a stage 12.

The dielectric patch member 5 can be crystallized by removing the solvent by heat treatment after adhesion. The crystallization may be performed by calcination treatment of the insulating layer at temperatures of 500° C. or more. This also allows the relative permittivity of the insulating layer to be increased. The crystalline state of the dielectric patch member can be confirmed by observation using a TEM (transmission electron microscope), or by cross-sectional observation using an FIB-SIM (Focused Ion Beam/Scanning Ion Microscope). The electric properties of the dielectric patch member can be measured by image recognition using a current-detection AFM (atomic force microscope) with a microprobe.

The dielectric patch member 5 can be formed by electrophoresis from the nucleus portion as the center thereof, using a water-soluble solution that contains dielectric ceramic particles with ionic character, or can be formed by sputtering with mask sputtering.

Note that, the content of the dielectric ceramic fine particle in the solution as described above is adjusted, and moreover a suitable amount of dispersing agent may be added to the solution. As such dispersing agent, a known surfactant can be used as appropriate. In particular, an alkyl glucoside, a polyethylene glycol, or a fatty acid sodium, or the like, which are surfactants, can be used. Alternatively, monomers in the dielectric ceramic fine particles may be dispersed by ultrasonic agitation.

In the thin film capacitor 1 in the present embodiment, the upper electrode layer 4 is formed after the formation of the dielectric patch member 5. As the material of the upper electrode layer 4 in the present embodiment, well-known conductive materials can be selected as appropriate. The well-known conductive materials refer to, for example, metals, metallic oxides, conductive organic materials, and the like, which can be selected as appropriate. In particular, the upper electrode layer 4 may have a low electric resistance and a high mechanical strength. For this reason, metals can be used therefor. Above all, Ni or Cu can be a relatively sturdy metallic material having a low electric resistance. The upper electrode layer 4 may be formed of a single Ni electrode or Cu electrode layer but may have a double-layer structure of a Ni electrode layer and a Cu electrode layer. Between the upper electrode layer 4 and the dielectric substance layer 3 or the dielectric patch member 5, a different conductive material may be interposed. In the case where the upper electrode layer 4 includes a Ni electrode layer, the Ni electrode layer side can be brought into contact with the dielectric substance layer 3. In the case of using a Ni electrode layer for the whole or a part of the upper electrode layer 4, a pure Ni or a Ni-based alloy can be used as with the lower electrode layer 2. In the case of a Ni-based alloy, for example, a noble metal element such as Pt, Pd, Ir, Ru, and Rh is preferably contained, and the content thereof can be 50 wt % or less. Furthermore, the thickness thereof preferably ranges from 0.1 μm to 2.0 μm.

On the Ni electrode layer of the present embodiment, a Cu electrode layer may be formed. The Cu electrode layer mentioned here can be a pure Cu (99.9% or more of Cu), or a Cu-based alloy. In the case of an alloy, for example, a noble metal element such as Pt, Pd, Ir, Ru, and Rh may be contained, and the content thereof can be 50 wt % or less. Cu has a feature that it has a resistivity equivalent to that of Au or Ag and is convenient for industrial use. For this reason, Cu is used for lines in electronic devices in many cases. In addition, using Cu for electrode layers of thin film capacitors has an effect of reducing an equivalent series resistance (ESR) due to its relatively small resistivity.

For the formation of the upper electrode layer 4, a method typically used in thin film formation, for example, the application of solution, sputtering, vapor deposition, PLD (Pulse Laser Deposition), CVD or the like can be used as appropriate.

EXAMPLES

Hereinafter, the present invention will be specifically described by way of examples. Note that the present invention is not limited to the following examples.

Example 1

A dielectric substance layer (BaTiO$_3$-based dielectric) was formed by a sputtering method with a thickness of 800 nm on a Ni foil having a size of 100 mm×100 mm. The Ni foil on which the dielectric substance layer was formed was thereafter annealed, and the dielectric substance layer on the Ni foil was thereby crystallized. The property evaluation of this dielectric substance layer showed that the relative permittivity thereof was 1000. As pretreatment for forming the dielectric patch member, foreign objects and the like were removed by scrub cleaning.

A dielectric patch member was formed by: preparing a Ni foil that includes a crystallized dielectric substance layer; causing aluminum oxide particles to collide with the dielectric substance layer by sputtering to form a nucleus portion; discharging in spraying a high-viscosity solution that contains dielectric ceramic fine particles at a concentration of 40%, from a solution spraying unit with a solution discharging device, aiming at the nucleus portion of a thin film capacitor that was placed on the stage 12, such that the area of a dielectric patch member became 120 μm$^2$; and processing the high-viscosity solution, after the formation of a structure, at a heat treatment temperature of 300° C. The surface of the dielectric substance layer was subjected to scanning observation with an electron microscope, and it was confirmed that one or more dielectric patch members had been formed in a 5 mm×5 mm area. The cross section of a part of the sample was observed with an electron microscope, and it was found that with respect to the shape of the dielectric patch member, the maximum thickness thereof was 1.2 μm, and the taper angle thereof was 18 degrees. The electric property of the dielectric patch member was checked, and the relative permittivity thereof was 100 (0.1 times that of the dielectric substance layer). Thereafter, Ni and Cu were deposited in this order by sputtering, as an upper electrode layer.

After the formation of the upper electrode layer, patterning of the upper electrode layer was performed to form a 5 mm×5 mm capacitor element portion. This patterning was performed such that a dielectric patch portion was always included in the 5 mm×5 mm capacitor element portion. Thereafter, annealing was performed in vacuum at 340° C. for particle growth of a Cu electrode layer, and the thin film capacitor was obtained. Reliability test was conducted on 100 thin film capacitors to evaluate aged deterioration in capacitance value and insulation resistance value.

The reliability test was conducted in such a manner as to measure capacitance values and insulation resistance values after 200 hours/400 hours/600 hours, with a signal of 5 VAC (1 kHz) continuously applied to the 100 thin film capacitors that were enclosed in a hermetically-sealed atmospheric-pressure container in which the temperature and the humidity were kept at 85 degrees and 85%, respectively. The capacitance values were measured at 1 kHz, 1 Vrms, using LCR Meter 4284A made by Agilent that is placed outside of the hermetically-sealed atmospheric-pressure container. The insulation resistance values were measured under a condition of 4 VDC, using High-Resistance Meter 4339B made by Agilent that is placed outside of the hermetically-sealed atmospheric-pressure container. The determination of aged deterioration was performed in such a manner as to calculate a property preservation ratio from the number of thin film capacitors that satisfies reference values of a capacitance value of $2.5 \times 10^{-7}$ F or more and an insulation resistance value of $5 \times 10^{+8} \Omega$ or more, the capacitance value and the insulation resistance value being typical specifications for thin film capacitors. The results showed that, in this example, conforming items were obtained at 81% (81/100 pcs) after 600 hours.

Example 2

The fabrication, the measurement, and the aged deterioration evaluation were performed by the same fabrication method and under the same evaluation condition as those in Example 1 except that the area of the dielectric patch member was 500 μm$^2$, and the concentration of dielectric ceramic fine particle was 37%. A taper angle was 18 degrees, a relative permittivity was 150 (0.15 times that of the dielectric substance layer), and a crystalline state was microcrystalline. The result showed that conforming items were obtained at 83% (83/100 pcs), after 600 hours.

Example 3

The fabrication, the measurement, and the aged deterioration evaluation were performed by the same fabrication method and under the same evaluation condition as those in Example 1 except that the area of the dielectric patch member was 700 μm², and the concentration of dielectric ceramic fine particle was 35%. A taper angle was 18 degrees, a relative permittivity was 200 (0.2 times that of the dielectric substance layer), and a crystalline state was microcrystalline. The result showed that conforming items were obtained at 87% (87/100 pcs) after 600 hours.

Example 4

The fabrication, the measurement, and the aged deterioration evaluation were performed by the same fabrication method and under the same evaluation condition as those in Example 1 except that the area of the dielectric patch member was 1000 μm², and the concentration of dielectric ceramic fine particle was 33%. A taper angle was 18 degrees, a relative permittivity was 300 (0.3 times that of the dielectric substance layer), and a crystalline state was microcrystalline. The result showed that conforming items were obtained at 89% (89/100 pcs) after 600 hours.

Example 5

The fabrication, the measurement, and the aged deterioration evaluation were performed by the same fabrication method and under the same evaluation condition as those in Example 1 except that the area of the dielectric patch member was 3000 μm², and the concentration of dielectric ceramic fine particle was 30%. A taper angle was 18 degrees, a relative permittivity was 400 (0.4 times that of the dielectric substance layer), and a crystalline state was microcrystalline. The result showed that conforming items were obtained at 88% (88/100 pcs) after 600 hours.

Example 6

The fabrication, the measurement, and the aged deterioration evaluation were performed by the same fabrication method and under the same evaluation condition as those in Example 1 except that the area of the dielectric patch member was 5000 μm², the concentration of dielectric ceramic fine particle was 27%, and the heat treatment temperature after the formation of the structure was 200° C. A taper angle was 10 degrees, a relative permittivity was 10 (0.01 times that of the dielectric substance layer), and a crystalline state was amorphous. The result showed that conforming items were obtained at 94% (94/100 pcs) after 600 hours.

Example 7

The fabrication, the measurement, and the aged deterioration evaluation were performed by the same fabrication method and under the same evaluation condition as those in Example 1 except that the area of the dielectric patch member was 10000 μm², the concentration of dielectric ceramic fine particle was 23%, and the heat treatment temperature after the formation of the structure was 200° C. A taper angle was 2 degrees, a relative permittivity was 20 (0.02 times that of the dielectric substance layer), and a crystalline state was amorphous. The result showed that conforming items were obtained at 92% (92/100 pcs) after 600 hours.

Example 8

The fabrication, the measurement, and the aged deterioration evaluation were performed by the same fabrication method and under the same evaluation condition as those in Example 1 except that the area of the dielectric patch member was 20000 μm², the concentration of dielectric ceramic fine particle was 20%, and the heat treatment temperature after the formation of the structure was 250° C. A taper angle was 12 degrees, a relative permittivity was 50 (0.05 times that of the dielectric substance layer), and a crystalline state was amorphous. The result showed that conforming items were obtained at 93% (93/100 pcs) after 600 hours.

Example 9

The fabrication, the measurement, and the aged deterioration evaluation were performed by the same fabrication method and under the same evaluation condition as those in Example 1 except that the area of the dielectric patch member was 30000 μm², the concentration of dielectric ceramic fine particle was 18%, and the heat treatment temperature after the formation of the structure was 250° C. A taper angle was 7 degrees, a relative permittivity was 100 (0.1 times that of the dielectric substance layer), and a crystalline state was amorphous.

The result showed that conforming items were obtained at 95% (95/100 pcs) after 600 hours.

Example 10

The fabrication, the measurement, and the aged deterioration evaluation were performed by the same fabrication method and under the same evaluation condition as those in Example 1 except that the area of the dielectric patch member was 50000 μm², the concentration of dielectric ceramic fine particle was 15%, and the heat treatment temperature after the formation of the structure was 270° C. A taper angle was a 3 degrees, a relative permittivity was 150 (0.15 times that of the dielectric substance layer), and a crystalline state was amorphous. The result showed that conforming items were obtained at 93% (93/100 pcs) after 600 hours.

Example 11

The fabrication, the measurement, and the aged deterioration evaluation were performed by the same fabrication method and under the same evaluation condition as those in Example 1 except that the area of the dielectric patch member was 70000 μm², the concentration of dielectric ceramic fine particle was 13%, and the heat treatment temperature after the formation of the structure was 500° C. A taper angle was 10 degrees, a relative permittivity was 500 (0.5 times that of the dielectric substance layer), and a crystalline state was polycrystal. The result showed that conforming items were obtained at 77% (77/100 pcs) after 600 hours.

Example 12

The fabrication, the measurement, and the aged deterioration evaluation were performed by the same fabrication method and under the same evaluation condition as those in Example 1 except that the area of the dielectric patch member was 100000 μm², the concentration of dielectric ceramic fine particle was 10%, and the heat treatment temperature after the formation of the structure was 550° C. A taper angle was 4 degrees, a relative permittivity was 600 (0.6 times that of the dielectric substance layer), and a crystalline state was polycrystal. The result showed that conforming items were obtained at 78% (78/100 pcs) after 600 hours.

Example 13

The fabrication, the measurement, and the aged deterioration evaluation were performed by the same fabrication method and under the same evaluation condition as those in Example 1 except that the area of the dielectric patch member was 300000 μm², the dielectric patch member was formed by mask sputtering using a silicon-oxide target, and the heat treatment temperature after the formation of the structure was 150° C. A taper angle was 5 degrees, a relative permittivity was 6 (0.006 times that of the dielectric substance layer), and a crystalline state was polycrystal. The result showed that conforming items were obtained at 71% (71/100 pcs) after 600 hours.

Example 14

The fabrication, the measurement, and the aged deterioration evaluation were performed by the same fabrication method and under the same evaluation condition as those in Example 1 except that the area of the dielectric patch member was 500000 μm², the concentration of dielectric ceramic fine particle was 5%, and the heat treatment temperature after the formation of the structure was 650° C. A taper angle was 3 degrees, a relative permittivity was 800 (0.8 times that of the dielectric substance layer), and a crystalline state was polycrystal. The result showed that conforming items were obtained at 73% (73/100 pcs) after 600 hours.

Example 15

The fabrication, the measurement, and the aged deterioration evaluation were performed by the same fabrication method and under the same evaluation condition as those in Example 1 except that the area of the dielectric patch member was 700000 μm², the concentration of dielectric ceramic fine particle was 3%, and the heat treatment temperature after the formation of the structure was 650° C. A taper angle was 2 degrees, a relative permittivity was 800 (0.8 times that of the dielectric substance layer), and a crystalline state was polycrystal. The result showed that conforming items were obtained at 72% (72/100 pcs) after 600 hours.

Example 16

The fabrication, the measurement, and the aged deterioration evaluation were performed by the same fabrication method and under the same evaluation condition as those in Example 1 except that the area of the dielectric patch member was 850000 μm², the dielectric patch member was formed by mask sputtering using a silicon-oxide target, no nucleus portion was included, and the heat treatment temperature after the formation of the structure was 150° C. A taper angle was 1 degree, a relative permittivity was 5 (0.005 times that of the dielectric substance layer), and a crystalline state was polycrystal. The result showed that conforming items were obtained at 66% (66/100 pcs) after 600 hours.

Example 17

The fabrication, the measurement, and the aged deterioration evaluation were performed by the same fabrication method and under the same evaluation condition as those in Example 1 except that stacking was performed in such a manner that the dielectric substance layer was formed by MOD so as to have a thickness of 800 nm, the area of the dielectric patch member was 10000 μm², the concentration of dielectric ceramic fine particle was 4%, no nucleus portion was included, and the heat treatment temperature after the formation of the structure was 700° C. A taper angle was 3 degrees, a relative permittivity was 800 (0.8 times that of the dielectric substance layer), and a crystalline state was polycrystal. The result showed that conforming items were obtained at 63% (63/100 pcs) after 600 hours.

Example 18

The fabrication, the measurement, and the aged deterioration evaluation were performed by the same fabrication method and under the same evaluation condition as those in Example 1 except that the area of the dielectric patch member was 950 μm², the concentration of dielectric ceramic fine particle 45%, no nucleus portion was included, and the heat treatment temperature after the formation of the structure was 630° C. A taper angle was 25 degrees, a relative permittivity was 850 (0.85 times that of the dielectric substance layer), and a crystalline state was polycrystal. The result showed that conforming items were obtained at 61% (61/100 pcs) after 600 hours.

Comparative Example 1

The fabrication, the measurement, and the aged deterioration evaluation were performed by the same fabrication method and under the same evaluation condition as those in Example 1 except that the area of the dielectric patch member was 50 μm², the concentration of dielectric ceramic fine particle 50%, no nucleus portion was included, and the heat treatment temperature after the formation of the structure was 700° C. A taper angle was 23 degrees, a relative permittivity was 800 (0.8 times that of the dielectric substance layer), and a crystalline state was polycrystal. The result showed that conforming items were obtained only at 9% (9/100 pcs) after 600 hours. This can be considered to be due to the influence of the dielectric patch member that was such small that charge consumption in a planar direction was insufficient, which disadvantageously made an electric charge reach the nucleus portion.

Comparative Example 2

The fabrication, the measurement, and the aged deterioration evaluation were performed by the same fabrication method and under the same evaluation condition as those in Example 1 except that the area of the dielectric patch member was 1000000 μm², the dielectric patch member was formed by mask sputtering using a silicon-oxide target, no nucleus portion was included, and the heat treatment temperature after the formation of the structure was 150° C. A taper angle was 1 degree, a relative permittivity was 4 (0.004 times that of the dielectric substance layer), and a crystalline state was polycrystal. The result showed that conforming items were obtained only at 5% (5/100 pcs) after 600 hours. This can be considered to be due to the influence of the dielectric patch member that was such large that an electric charge accumulated in an outermost portion tried flowing in the thickness direction of the dielectric substance layer that is relatively low in electric resistance.

Comparative Example 3

The fabrication, the measurement, and the aged deterioration evaluation were performed by the same fabrication method and under the same evaluation condition as those in Example 1 except that the area of the dielectric patch member was 1000 µm², the concentration of dielectric ceramic fine particle was 60%, no nucleus portion was included, and the heat treatment temperature after the formation of the structure was 700° C. The result showed that conforming items were obtained only at 6% (6/100 pcs), having a taper angle of 27 degrees, a relative permittivity of 850 (0.85 times that of the dielectric substance layer), and a crystalline state being polycrystal, after 600 hours. This can be considered to be due to the influence of a wide taper angle, which increased the accumulation of an electric charge in an outermost portion, causing short circuit or leakage current.

Comparative Example 4

The fabrication, the measurement, and the aged deterioration evaluation were performed by the same fabrication method and under the same evaluation condition as those in Example 1 except that the area of the dielectric patch member was 10000 µm², the dielectric patch member was formed by mask sputtering using a silicon-oxide target, no nucleus portion was included, and the heat treatment temperature after the formation of the structure was 150° C. The result showed that conforming items were obtained only at 3% (3/100 pcs), having a taper angle of 0.5 degrees, a relative permittivity of 5 (0.005 times that of the dielectric substance layer), and a crystalline state being polycrystal, after 600 hours. This can be considered to be due to the influence of a narrow taper angle, which caused poor adhesion of the film and caused accumulation of an electric charge to spread in a wide area.

Comparative Example 5

The fabrication, the measurement, and the aged deterioration evaluation were performed by the same fabrication method and under the same evaluation condition as those in Example 1 except that the dielectric patch member was not formed, and no nucleus portion was included. The result showed that conforming items were obtained only at 1% (1/100 pcs) after 600 hours. As the cause of this, it can be considered that the absence of the dielectric patch member caused dielectric breakdown to occur frequently.

As to the thin film capacitors of the above-described examples and the comparative examples, the fabrication conditions and the results of the evaluation are shown in Table 1.

TABLE 1

| | Condition | | | | | Result | | | |
|---|---|---|---|---|---|---|---|---|---|
| | Dielectric patch member forming method | Dielectric patch member area (µm²) | Fine particle concentration (%) | Heat treatment temperature (° C.) | Nucleus Portion present? | Taper angle | Relative permittivity | Crystalline state | Reliability (600-hr conforming item rate) |
| Example 1 | Inkjet | 120 | 40% | 300 | Yes | 18 Deg | 100 | Microcrystal | 81/100 pcs |
| Example 2 | Inkjet | 500 | 37% | 300 | Yes | 18 Deg | 150 | Microcrystal | 83/100 pcs |
| Example 3 | Inkjet | 700 | 35% | 300 | Yes | 18 Deg | 200 | Microcrystal | 87/100 pcs |
| Example 4 | Inkjet | 1000 | 33% | 300 | Yes | 18 Deg | 300 | Microcrystal | 89/100 pcs |
| Example 5 | Inkjet | 3000 | 30% | 300 | Yes | 18 Deg | 400 | Microcrystal | 88/100 pcs |
| Example 6 | Inkjet | 5000 | 27% | 200 | Yes | 10 Deg | 10 | Amorphous | 94/100 pcs |
| Example 7 | Inkjet | 10000 | 23% | 200 | Yes | 2 Deg | 20 | Amorphous | 92/100 pcs |
| Example 8 | Inkjet | 20000 | 20% | 250 | Yes | 12 Deg | 50 | Amorphous | 93/100 pcs |
| Example 9 | Inkjet | 30000 | 18% | 250 | Yes | 7 Deg | 100 | Amorphous | 95/100 pcs |
| Example 10 | Inkjet | 50000 | 15% | 270 | Yes | 3 Deg | 150 | Amorphous | 93/100 pcs |
| Example 11 | Inkjet | 70000 | 13% | 500 | Yes | 10 Deg | 500 | Polycrystal | 77/100 pcs |
| Example 12 | Inkjet | 100000 | 10% | 550 | Yes | 4 Deg | 600 | Polycrystal | 78/100 pcs |
| Example 13 | Mask sputtering | 300000 | — | 150 | Yes | 5 Deg | 6 | Polycrystal | 71/100 pcs |
| Example 14 | Inkjet | 500000 | 5% | 650 | Yes | 3 Deg | 800 | Polycrystal | 73/100 pcs |
| Example 15 | Inkjet | 700000 | 3% | 650 | Yes | 2 Deg | 800 | Polycrystal | 72/100 pcs |
| Example 16 | Mask sputtering | 850000 | — | 150 | No | 1 Deg | 5 | Polycrystal | 66/100 pcs |
| Example 17 | Inkjet | 10000 | 4% | 700 | No | 3 Deg | 800 | Polycrystal | 63/100 pcs |
| Example 18 | Inkjet | 950 | 45% | 630 | No | 25 Deg | 850 | Polycrystal | 61/100 pcs |
| Comparative example 1 | Inkjet | 50 | 50% | 700 | No | 23 Deg | 800 | Polycrystal | 9/100 pcs |
| Comparative example 2 | Mask sputtering | 1000000 | — | 150 | No | 1 Deg | 4 | Polycrystal | 5/100 pcs |
| Comparative example 3 | Inkjet | 1000 | 60% | 700 | No | 27 Deg | 850 | Polycrystal | 6/100 pcs |
| Comparative example 4 | Mask sputtering | 10000 | — | 150 | No | 0.5 Deg | 5 | Polycrystal | 3/100 pcs |
| Comparative example 5 | Without dielectric patch member | — | — | — | No | — | — | — | 1/100 pcs |

The present inventors confirmed, through the examples and the comparative examples, that the thin film capacitor of the present embodiment is a thin film capacitor that prevents dielectric breakdown and has a good durability.

What is claimed is:

1. A thin film capacitor comprising
a lower electrode layer, an upper electrode layer, and a dielectric substance layer provided between the lower electrode layer and the upper electrode layer, wherein
a dielectric patch member is formed on a surface of the dielectric substance layer on an upper electrode layer side,
the dielectric patch member is formed of a dielectric material,
a cross-sectional structure of the dielectric patch member has a taper angle of 1 degree to 25 degrees in a cross section perpendicular to the dielectric substance layer, the taper angle being an angle formed by (1) a tangential line tangent to an end portion of the dielectric patch member at a position that is 50% of a maximum height of the dielectric patch member and (2) a line being an interface between the dielectric substance layer and the upper electrode layer,
an area of the dielectric patch member is 100 $\mu^2$ to 900000 $\mu m^2$; and
a nucleus portion is formed on an interface between the dielectric substance layer and the dielectric patch member.

2. The thin film capacitor according to claim 1, wherein a relative permittivity of the dielectric patch member is 0.01 times or more and 0.7 times or less a relative permittivity of the dielectric substance layer.

3. The thin film capacitor according to claim 2, wherein a crystalline state of the dielectric patch member is different from a crystalline state of the dielectric substance layer.

4. The thin film capacitor according to claim 3, wherein a crystalline state of the dielectric patch member is amorphous.

5. The thin film capacitor according to claim 2, wherein a crystalline state of the dielectric patch member is amorphous.

6. The thin film capacitor according to claim 1, wherein a crystalline state of the dielectric patch member is different from a crystalline state of the dielectric substance layer.

7. The thin film capacitor according to claim 6, wherein a crystalline state of the dielectric patch member is amorphous.

8. The thin film capacitor according to claim 1, wherein a crystalline state of the dielectric patch member is amorphous.

* * * * *